Oct. 3, 1933.     H. E. SIPE     1,929,083
FASTENING DEVICE
Original Filed July 19, 1927
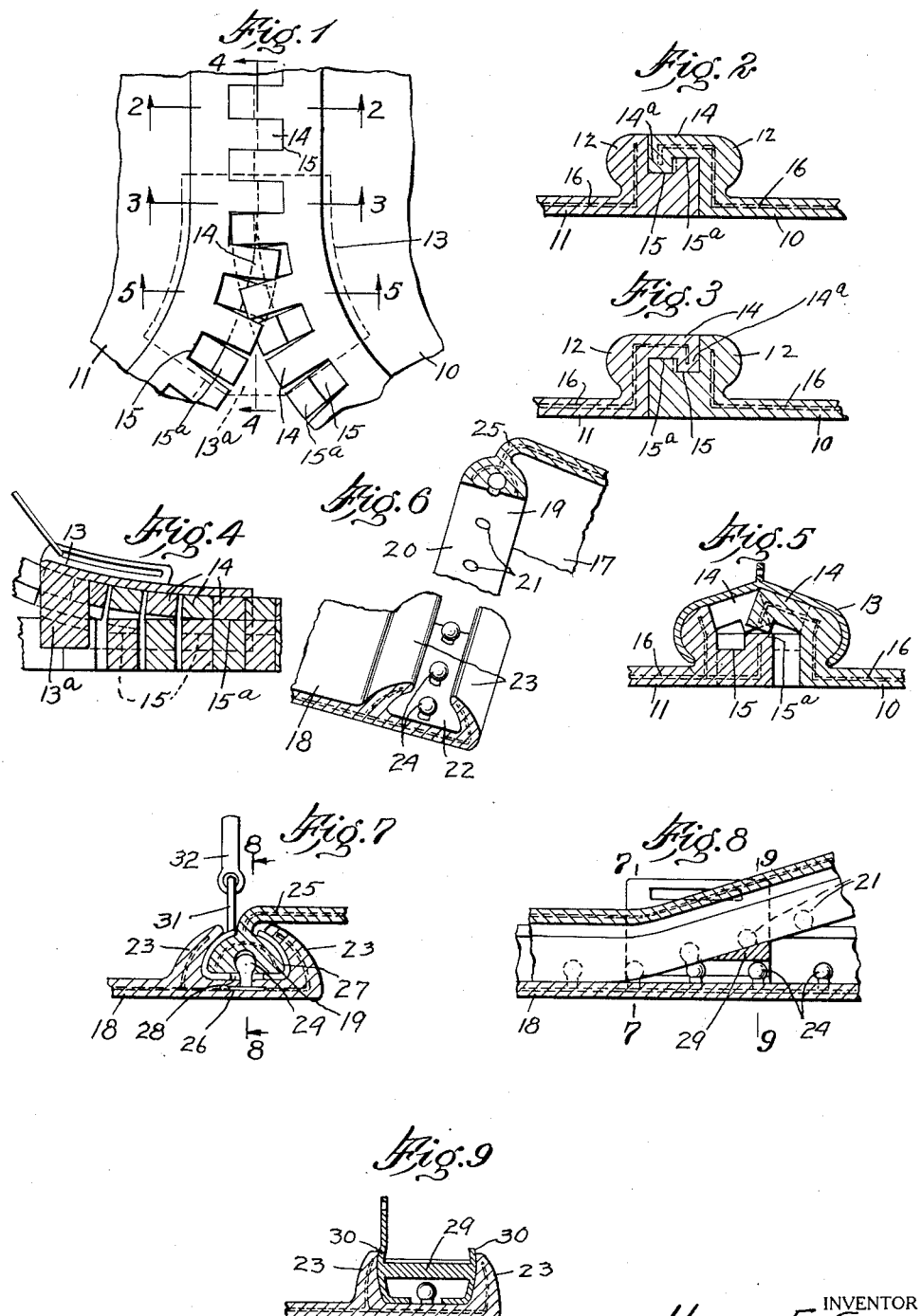
INVENTOR
Harry E. Sipe
BY
ATTORNEY Patented Oct. 3, 1933

1,929,083

UNITED STATES PATENT OFFICE 1,929,083

FASTENING DEVICE

Harry E. Sipe, New York, N. Y., assignor to Hookless Fastener Company, Meadville, Pa., a corporation of Pennsylvania Application July 19, 1927, Serial No. 206,806
Renewed January 27, 1932

6 Claims. (Cl. 24—205)

This invention relates to fastening devices and particularly to devices of this class for quickly coupling and uncoupling the separate parts of articles of apparel, containers and like devices; and the object of the invention is to provide a fastening device composed of two elongated strips or parts having interlocking and intermeshing members for locking the parts against separation in two angularly disposed planes of stress or pull; a further object being to provide a fastening device of the class described, the body portions of the separate parts of which are composed of rubber or composition rubber, preferably reinforced by fibrous or other material, said parts having members interlocking with each other vertically with respect to the horizontal plane thereof as well as being otherwise intermeshed or interlocked, a suitable slider being employed for coupling and uncoupling said parts; a further object being to provide a device employing interlocking members of the snap fastener type having spaced knob and socket portions extending longitudinally thereof adapted to be snapped into and out of engagement with each other in coupling and uncoupling said parts; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of a part of a device made according to my invention and indicating the method of coupling and uncoupling the same.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a section on the line 5—5 of Fig. 1.

Fig. 6 is a perspective view of the separate parts of a modified form of device which I employ.

Fig. 7 is a cross section of the device shown in Fig. 6, the section being on the line 7—7 of Fig. 8.

Fig. 8 is a section on the line 8—8 of Fig. 7; and,

Fig. 9 is a section on the line 9—9 of Fig. 8.

In Figs. 1 to 5 inclusive, I have shown a fastening device composed of two similar parts 10 and 11, each of said parts having on their adjacent faces, enlarged portions 12 having rounded outer faces to facilitate the movement of a slider 13 longitudinally of said parts. The adjacent faces of the enlarged portions 12 of said parts are provided with spaced hook-shaped members 14, the hook or offset portions 14a of which are adapted to enter sockets 15 in the other part as clearly seen in comparing Figs. 2 and 3 of the drawing. In Fig. 2, the hook-shaped member 14 of the part 10 engages the socket 15 in the part 11, whereas in Fig. 3, the hook-shaped member 14 of the part 11 engages the socket 15 in the part 10. The shoulder portions 15a formed by the sockets 15 engage the hook parts 14a and while these members are comparatively thin in actual practice, the showing in the drawing is exaggerated for clearness, as is also the dimensions of the fastening device as a whole.

In coupling the parts 10 and 11 together by the slider 13 which is generally of conventional form, the hook members 14 are brought into the sockets 15 of the respective parts in the manner seen in Fig. 1 of the drawing. In order to couple the hook portions 14a with the shoulders 15a, the slider is provided with a spacing member 13a which holds the hook portions 14a in spaced relation with said shoulders until such time as the parts have been at least partially coupled together, after which the hook portions 14a will drop into the sockets 15 and the parts will be coupled together and retained against lateral displacement. It will be understood that the sockets 15 extend upwardly through the upper faces of the respective parts and are of the general form of the hook members 14 as clearly seen in Fig. 1 of the drawing. In like manner, when the parts are uncoupled, the spacing member 13a will serve to separate the hook members 14 and move them out of engagement with the sockets 15. Both parts 10 and 11 are preferably reinforced as seen at 16, and this reinforcement extends into the enlarged portions 12 of said parts as well as the hook members 14 thereof. The reinforcement may be in the form of fibrous or metallic material, being flexible however, to permit of the free flexure of the separate parts of the device in the operation of coupling and uncoupling the same.

In Figs. 6 to 9 inclusive, I have shown a modification wherein two parts 17 and 18 are employed, the part 17 having an enlarged portion 19 arranged at right angles to one face thereof, and being substantially semi-circular in cross sectional form, the flat face 20 of which is directed downwardly, said flat face having spaced apertures 21 which open into the enlarged portion 19 forming sockets of what might be termed snap fastening units. The part 18 is provided with a channel or socket portion 22 extending longitudinally of one face thereof and formed by inwardly curved and upwardly extending flanges 23. Arranged centrally of the bottom of the socket or channel 22 are spaced knobs or projections 24 constituting the male parts of what might be termed snap fastening units which are adapted to pass into the sockets 21 in the member 19 in the operation of placing the member 19 in the channel or socket 22 of the part 18. It will be noted that the parts 17 and 18 are reinforced as seen at 25 to give strength and durability to said parts, and the reinforcement extending into the enlargement 19 as well as into the flanges 23. The notches or projections 24 may be formed of the material of the part 18 and be composed of fibre, metal or other rigid material, and anchored to the reinforcement 25 as indicated at 26 in Fig. 7 of the drawing.

With this device, the slider 27 is mounted to move longitudinally of the channel or socket 22 and is of the general cross sectional form of said channel as seen in Fig. 7, one end of the lower portion of the slider being apertured as seen at 28 to permit of the passage of the members 24 therethrough. The separate side parts of the slider, which are of the cross sectional form seen in Fig. 7 are joined at the opposite end by a bridging body 29 arranged above the projecting members 24. At said end of the body, the side portions of the slider are enlarged as seen at 30 and extend upwardly to separate the flanges 23 to permit of the insertion of the member 19 into the channel or socket 22. In the action of the slider in its movement longitudinally of the channel 22, in coupling and uncoupling the parts 17 and 18, the enlargement 19 is forced downwardly to the members 24 to snap said members into the sockets 21 as will be apparent and as indicated in Fig. 8 of the drawing. The bridge portion 29 serves to raise the member 19 out of engagement with the projections 24 in the operation of uncoupling said parts. The slider is provided with an upwardly directed extension 31 for supporting a finger piece 32 by means of which the slider may be moved longitudinally of the separate parts in coupling and uncoupling the same.

From the foregoing, it will be apparent that in both forms of construction employed, in addition to interlocking or coupling the separate parts of the fastening device together, a vertical lock or coupling is provided between said parts, thus adding to the securing properties of the device, and yet producing a device which will be flexible, to permit of its use on articles of apparel, constainers and other devices in a very practical and efficient manner, many uses of the device being possible, and at the same time, a substantially water-tight or moisture-proof coupling is provided between the parts.

It will be understood that while I have shown certain details of construction for carrying my invention into effect, that I am not necessarily limited to these details, and various changes in and modifications of the construction herein shown and described may be made within the scope of the appended claims without departing from the spirit of my invention or sacrificing its advantages.

Having fully described my invention, what I claim as new and desire to secure by Letters Patent, is:—

1. A fastening device of the class described, comprising two parts adapted to be coupled together, one of said parts being composed of flexible non-metallic material and having a socket portion opening outwardly through one side face of said part, and the other part being composed of flexible non-metallic material and having an enlarged portion arranged at right angles to said part and adapted to be placed in the socket portion of the first named part to form an interlock and coupling between said parts arranged at right angles to the longitudinal plane thereof, and knob and socket members on said parts and spaced longitudinally thereof and adapted to be coupled together in the coupling of said parts.

2. A fastening device of the class described, comprising two parts adapted to be coupled together, one of said parts being composed of flexible non-metallic material and having a socket portion opening outwardly through one side face of said part, and the other part being composed of flexible non-metallic material and having an enlarged portion arranged at right angles to said part and adapted to be placed in the socket portion of the first named part to form an interlock and coupling between said parts arranged at right angles to the longitudinal plane thereof, knob and socket members on said parts and spaced longitudinally thereof and adapted to be coupled together in the coupling of said parts, and a slide member movable longitudinally of said parts for coupling and uncoupling the same.

3. A fastening device of the class described comprising two continuous, elongated and interlocking parts composed of flexible material, the adjacent edges of said parts being overlapped, means on the overlapped faces of said parts for coupling the same together and for forming a watertight connection betwen said parts, said means comprising a channel extending longitudinally of the side face of one of said parts, an enlarged member extending at right angles from the side face of the other of said parts and also including snap fastening elements on the respective parts and spaced longitudinally thereof.

4. A fastening device of the class described comprising two continuous, elongated and interlocking parts composed of flexible material, the adjacent edges of said parts being overlapped, means on the overlapped faces of said parts for coupling the same together and for forming a watertight connection between said parts, said means comprising a channel extending longitudinally of the side face of one of said parts, an enlarged member extending at right angles from the side face of the other of said parts and also including snap fastening elements on the respective parts and spaced longitudinally thereof, said parts being composed of rubber and means for reinforcing and strengthening said parts.

5. A fastening device of the class described comprising two continuous, elongated and interlocking parts composed of flexible material, means slidably engaging said parts for coupling and uncoupling the same, the adjacent edges of said parts being overlapped, means on the overlapped faces of said parts for coupling the same together and for forming a watertight connection between said parts, said means comprising a channel extending longitudinally of the side face of one of said parts, an enlarged member extending at right angles from the side face of the other of said parts and also including snap fastening elements on the respective parts and spaced longitudinally thereof, said parts being composed of rubber, means for reinforcing and strengthening said parts, and said reinforcing means comprising flexible material.

6. A fastening device of the class described comprising two parts having knob and socket members composed of flexible, non-metallic material and spaced longitudinally of said parts, the knob and socket members being arranged at right angles to the longitudinal plane of said parts, said parts being overlapped in coupling the knob members with said socket members in securing said parts together, a slide member slidably engaging one of said parts and cooperating with the other part to couple and uncouple said parts, means on said last named part for guiding the slide member in its movement thereon, said means comprising a channel extending longitudinally of one side face of said part, and said knob members being arranged centrally and longitudinally of the bottom wall of said channel.

HARRY E. SIPE.